No. 653,222. Patented July 10, 1900.
T. DON & C. M. FOWLER.
MEAT TENDERER.
(Application filed Oct. 28, 1899.)

(No Model.)

Witnesses:
Henry R. Page
Margaret E. Daley

Inventors:
Thomas Don and Charles M. Fowler
by Alban Andrien, their atty

UNITED STATES PATENT OFFICE.

THOMAS DON AND CHARLES M. FOWLER, OF LOWELL, MASSACHUSETTS; SAID DON ASSIGNOR TO SAID FOWLER.

MEAT-TENDERER.

SPECIFICATION forming part of Letters Patent No. 653,222, dated July 10, 1900.

Application filed October 28, 1899. Serial No. 735,145. (No model.)

*To all whom it may concern:*

Be it known that we, THOMAS DON and CHARLES M. FOWLER, citizens of the United States, residing at Lowell, in the county of Middlesex and State of Massachusetts, have invented new and useful Improvements in Meat-Tendering Devices, of which the following is a specification.

This invention relates to improvements in meat-tendering devices for the purpose of breaking or cutting the sinews of steaks or meats, &c., so as to make them tender and readily masticated; and it is carried out as follows, reference being had to the accompanying drawings, wherein—

Figure 1:
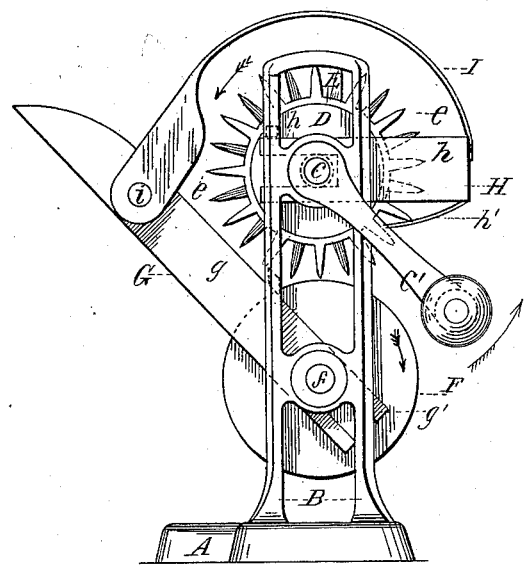
Figure 2:
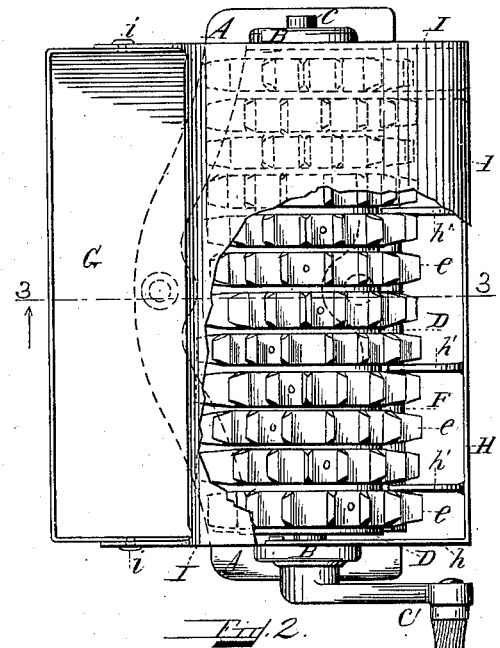
Figure 3:
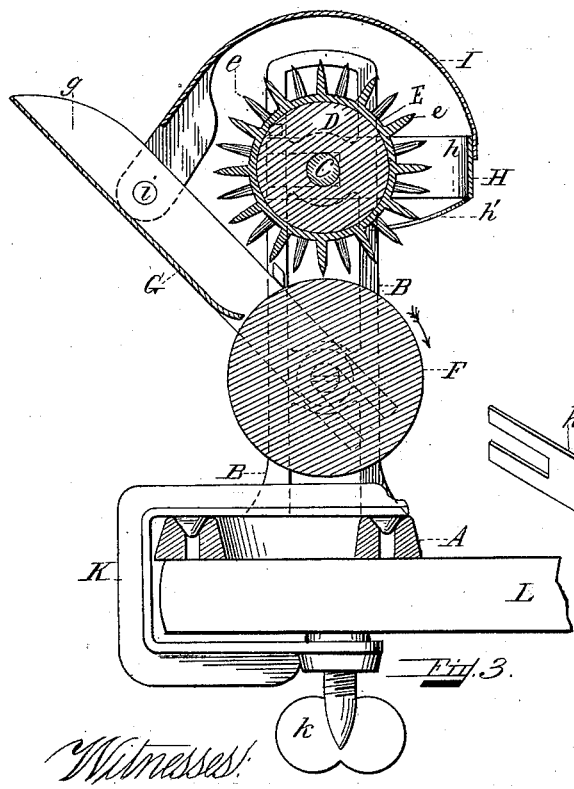
Figure 4:
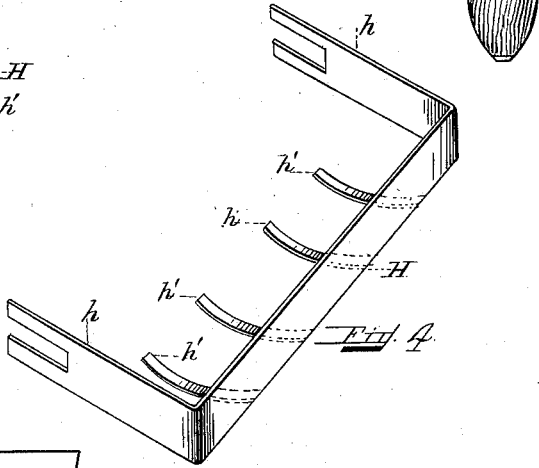

Figure 1 represents an end elevation of the improved meat-tendering device. Fig. 2 represents a top plan view showing a portion of the hinged hood removed. Fig. 3 represents a cross-section on the line 3 3, shown in Fig. 2; and Fig. 4 represents a detail perspective view of the removable comb for automatically releasing the food from the pronged tendering-roller during the process of tendering the steak or other food.

Similar letters refer to similar parts wherever they occur on the different parts of the drawings.

The device consists of a base A, to which are attached or made in one piece the upright standards or end frames B B, as shown. In bearings in the upper portion of the standards B B is journaled the shaft C, to which is attached a roller D, preferably made of wood. To such roller D is attached, preferably, a series of rings E E, provided with radially-extending meat-tendering flattened prongs $e\ e$, sharpened at their extremities, as shown. The said prongs $e\ e$ may be made integral with a series of rings E E, secured to the roller D, or may be made integral with a cylinder extending the whole length of said roller, without departing from the essence of our invention. The prongs, if so desired, may be made integral with the roller D, although in practice we prefer to make such prongs integral with a cylinder or rings, which are afterward secured in a suitable manner to said roller D.

Below the pronged rotary meat-tendering roller is located a loosely-journaled food-supporting roller F, attached to a shaft $f$, loosely journaled in bearings in the standards B B, as shown.

To the shaft C is attached a crank C', by means of which a rotary motion may be imparted to the tendering-roller in the direction of the arrow shown in Figs. 1 and 3.

G is an inclined feeder or feed-table, on which the meat, &c., is placed and fed between the tendering-roll and supporting-roll, as shown in the drawings. Such feeder is preferably provided at its ends with ribs or flanges $g\ g$, having forked lower ends $g'\ g'$, adapted to fit over the ends of the shaft or trunnions $f f$ on the roller F, as shown, and by this arrangement the said feeder G may be detached from the shaft or trunnions $f f$ whenever it is desired to clean the apparatus.

H is a comb-frame, preferably provided with forked ends $h\ h$, adapted to be removably fitted onto the ends of the roller-shaft C, so as to be detachable therefrom whenever so desired. The comb-frame is provided with a series of teeth $h'\ h'$, projecting between the tendering-prongs $e\ e$ for the purpose of releasing the meat from the prongs of the tendering-roller after the meat has been fed between the tendering and supporting rollers.

To the sides of the inclined feed-table G is pivotally connected at $i\ i$ the hood or guard I, that partially surrounds the toothed tendering-roll for the purpose of preventing the hands of the operator from coming in contact with the teeth of said tendering-roll during the operation of the device. Whenever it is desired to clean the tendering-roll from food accumulations, it is only necessary to swing the hood I forward on the pivots $i\ i$, by which the said tendering-roll is exposed for cleaning purposes.

If so desired, the inclined feed-table G and the hood pivoted to it may be removed from the roll-shaft $f$ simply by withdrawing said feed-table from the said roll-shaft $f$.

In the operation of the device the operator turns the roller D by manipulating the crank C' in the direction shown by the arrow in Fig. 1 and at the same time places the steak or other food to be tendered onto the inclined feed-plate G, which is then acted on by the teeth $e\ e$ of the tendering-roll and carried by said teeth between said tendering-roll and the lower food-supporting roll F, by which operation the teeth of the tendering-roll are caused to penetrate the steak or food, causing the sinews to be cut so as to render the food tender and easily masticated when cooked or broiled.

The base-plate A may be permanently secured in position upon a bench, bracket, or table; but in practice we prefer to use in connection with it a suitable clamp K, provided with a thumb-screw $k$, by means of which the device may be temporarily secured to a table-top L, as shown in Fig. 3.

What we wish to secure by Letters Patent and claim is—

1. The herein-described meat-tendering device consisting in combination a base-plate provided with standards, a rotary tendering-roll journaled in said standards and having radially-projecting teeth, a loosely-rotating supporting-roll journaled in said standards below the tendering-roll, a detachable feed-table, and a hood pivotally connected to the latter, substantially as and for the purpose set forth.

2. In a meat-tendering device in combination a rotary tendering-roll, having a series of prongs or teeth, a loosely-journaled supporting-roller arranged below said tendering-roll, a detachable feed-table, a hood or cover pivotally connected to the latter, and a detachable comb-bar having projections arranged between the rows of teeth on the tendering-roll, substantially as and for the purpose set forth.

3. In a meat-tendering device a rotary roll D, having secured to it one or more rings E, provided with radial teeth or prongs $e, e$, combined with a loosely-rotating supporting-roll F, and a removable feed-table having pivoted to it a hood or cover, and a removable pronged comb-bar H having inwardly-projecting cleaning-prongs $h, h$, substantially as and for the purpose set forth.

In testimony whereof we have hereunto set our hands in presence of two subscribing witnesses.

THOMAS DON.
CHARLES M. FOWLER.

Witnesses:
JOHN J. DEVINE,
NATHAN D. PRATT.